United States Patent
Bhat et al.

(10) Patent No.: US 12,050,451 B2
(45) Date of Patent: Jul. 30, 2024

(54) METHOD OF CONTROLLING DATA TRANSFER IN A MANUFACTURING PLANT AND A SYSTEM THEREOF

(71) Applicant: ABB Schweiz AG, Baden (CH)

(72) Inventors: Shrikant Bhat, Bangalore (IN); Raoul Jetley, Bangalore (IN)

(73) Assignee: ABB Schweiz AG, Baden (CH)

( * ) Notice: Subject to any disclaimer, the term of this patent is extended or adjusted under 35 U.S.C. 154(b) by 230 days.

(21) Appl. No.: 17/276,838

(22) PCT Filed: Sep. 17, 2019

(86) PCT No.: PCT/IB2019/057805
§ 371 (c)(1),
(2) Date: Mar. 17, 2021

(87) PCT Pub. No.: WO2020/058838
PCT Pub. Date: Mar. 26, 2020

(65) Prior Publication Data
US 2021/0349447 A1    Nov. 11, 2021

(30) Foreign Application Priority Data
Sep. 18, 2018   (IN) .............................. 201841035063

(51) Int. Cl.
*G05B 19/418*   (2006.01)

(52) U.S. Cl.
CPC ..... *G05B 19/4185* (2013.01); *G05B 19/4183* (2013.01); *G05B 19/41865* (2013.01); *G05B 19/41885* (2013.01)

(58) Field of Classification Search
CPC ............ G05B 19/4185; G05B 19/4183; G05B 19/41865; G05B 19/41885; Y02P 90/30;
(Continued)

(56) References Cited

U.S. PATENT DOCUMENTS

2014/0241354 A1*  8/2014  Shuman .................. H04W 4/08
                                              370/390
2016/0205106 A1*  7/2016  Yacoub ............... H04W 12/041
                                              726/28
(Continued)

FOREIGN PATENT DOCUMENTS

KR       20140045829 A     4/2014
RU        2648564 C1       3/2018

OTHER PUBLICATIONS

European Patent Office, International Search Report for PCT/IB2019/057805, Jan. 2, 2020, 3 pages.
(Continued)

*Primary Examiner* — Christopher E. Everett
(74) *Attorney, Agent, or Firm* — Leydig, Voit & Mayer, Ltd.

(57) ABSTRACT

In an embodiment, the present disclosure discloses a method and a module for controlling data transfer in a manufacturing plant. The IoT module is configured to receive a request for a plurality of parameters from a second application from one or more applications. The request is made by a first application from the one or more applications. The IoT module determines status of the requested parameters. The status indicates if the requested parameters are authorized for sharing. Further, the IoT module transfers only the authorized parameters to the first module based on the status. Thus, the present disclosure provides a method and a IoT module for sharing data securely within the manufacturing plant.

11 Claims, 5 Drawing Sheets

(58) Field of Classification Search
CPC ........ Y02P 90/80; G06Q 10/08; G06Q 50/04; G06Q 10/06
See application file for complete search history.

(56) References Cited

U.S. PATENT DOCUMENTS

| | | | |
|---|---|---|---|
| 2017/0201494 A1* | 7/2017 | Temme | G06F 21/602 |
| 2017/0242935 A1* | 8/2017 | Wragg | G05B 19/0423 |
| 2018/0052451 A1* | 2/2018 | Billi-Duran | G05B 19/41835 |

OTHER PUBLICATIONS

European Patent Office, Written Opinion for PCT/IB2019/057805, Jan. 2, 2020, 9 pages.
A. Cannata et al., "SOCRADES: A framework for developing intelligent systems in manufacturing," Industrial Engineering and Engineering Management, Dec. 8, 2008, pp. 1904-1908.
Onoriode Uviase et al., "IoT Architectural Framework: Connection and Integration Framework for IoT Systems," available at https://arxiv.org/abs/1803.04780v1, 2018, 17 pages.
Navjot Kaur et al., "Web Services—Based Control Devices for Future Generation Distributed Automation Systems," Jul. 2, 2010, 6 pages.
Indian Patent Office, First Examination Report for IN 201841035063, Nov. 23, 2020, 5 pages.

* cited by examiner

METHOD OF CONTROLLING DATA TRANSFER IN A MANUFACTURING PLANT AND A SYSTEM THEREOF

TECHNICAL FIELD

The current invention relates to information management systems, and more particularly the current invention relates to a method and system for transferring authorized information between the plurality of subsystems of a product manufacturing plant.

BACKGROUND

In a manufacturing plant, product manufacturing requires data sharing/transfer between a plurality of subsystems. The usual subsystems in the manufacturing plant are an inventory system, a quality system, a material procurement system, a process control system, an Enterprise Management Platform (ERP) system, an order processing system, a manufacture execution system, a production system, a maintenance and a scheduling system. In order to deliver a quality product in a cost-effective way, the plurality of subsystems have to work in close coordination. Generally, common established platforms such as Enterprise Resource Planning (ERP) applications and Manufacturing Execution Systems (MES) are used to establish a coordination between the plurality of platforms. Usually, all parameters of a subsystem are shared with other subsystems. Hence, in conventional systems, there is lack of control over what information is shared. Also, as all information is shared, data security is lacking.

Conventional systems use various web and mobile applications-based approaches to establish coordination between the plurality of subsystems and to deliver value-add features. Use of such applications require dedicated software designed to address specific features, involving system specific engineering and configuration requirements. Such software is suitable and cost effective for system spanning a large number of inputs/outputs. However, for small scale manufacturing plants, complex systems with large engineering efforts, hardware, service and maintenance costs are not cost effective. In the cases of lighter manufacturing systems, the coordination tends to happen through emails, phone calls, interactive applications, word, spreadsheet documents.

Few other existing systems make use of centralized cloud system for sharing data with each of the plurality of subsystems. In the cloud-based systems the data is present in a secure cloud platform and may be accessed by any of the subsystems. Few functionalities common to each of the subsystems may be implemented in the cloud platform and may be accessible by each of the subsystems. Such cloud-based systems require continuous support from a software team for subsequent changes and modifications in the back-end. There is, therefore, a need for a user-friendly and a secure approach for maintaining a coordination among the subsystems of a manufacturing plant.

SUMMARY OF THE INVENTION

In an embodiment, the present invention relates to a method and an Internet of Things (IoT) module for controlling data transfer in a product manufacturing plant. A typical product manufacturing plant comprises a plurality of subsystems. The plurality of subsystems includes but is not limited to an inventory system, a quality system, a material procurement system, a process control system, an Enterprise Management Platform (ERP) system, an order processing system, a manufacture execution system, a production system, a maintenance and a scheduling system. Each subsystem is associated with a plurality of operational parameters. Further, each subsystem is operated by one or more applications (spreadsheet, word processing, and the like) using the plurality of operational parameters of corresponding subsystem. In an embodiment, each application is configured and authorized to share certain operational parameters from the plurality of operational parameters with other applications. Generally, the operational parameters of one application are shared with other applications for efficient working of the manufacturing plant. In an embodiment, the plurality of parameters is shared over a plant network.

In an embodiment, the IoT module is a plug-in installed in devices hosting each application. Thus, the IoT module is associated with each application. The IoT module installed in a device hosting a first application is connected to the IoT module installed in a device hosting a second application via the plant network. Likewise, each application is connected to each other application via the IoT module installed in respective devices. In an embodiment, the IoT module in each device can be connected by a dedicated network including Wi-Fi, Bluetooth, LAN, and the like.

In an embodiment, an operator of a subsystem provides authorization for sharing certain operational parameters of the subsystem with other subsystems. In an embodiment, the IoT module associated with the first application receives a request for one or more operational parameters associated with at least a second application. Here, the first application may require operational parameters of a specific application from the one or more applications or operational parameters of all the applications. The IoT module associated with the first application forwards the request to the IoT module associated with the second application. The IoT module associated with the second application verifies if the one or more parameters requested by the first application are authorized for sharing. The authorization can be provided by the operator operating the second application or a super user. In an embodiment, the super user can be a person having default authority to delete, edit, upload, or modify the parameters Thereafter, the IoT module associated with the second application shares/transfers the parameters associated with the second application which are authorized to the IoT module associated with the first application. Thus, the parameters associated with the application are shared based on sharing status/authorization status associated with it. Therefore, data security is maintained in the manufacturing plant.

In an embodiment, the IoT module is integrated with an application via an application interface. The IoT module can also have a user interface. The user interface enables operator to choose parameters to be shared (IoT enabled). In an embodiment, the operator can select target applications with which the IoT parameters have to be shared.

Systems of varying scope are described herein. In addition to the aspects and advantages described in this summary, further aspects and advantages will become apparent by reference to the drawings and with reference to the detailed description that follows.

BRIEF DESCRIPTION OF THE DRAWINGS

The subject matter of the invention will be explained in more detail in the following text with reference to preferred exemplary embodiments which are illustrated in the drawings, in which.

DETAILED DESCRIPTION

In an embodiment, the present invention discloses a method and an Internet of Things (IoT) module for controlling transfer of information in a product manufacturing plant. The proposed invention helps in organized information transfer and provides data security.

Figure 1:
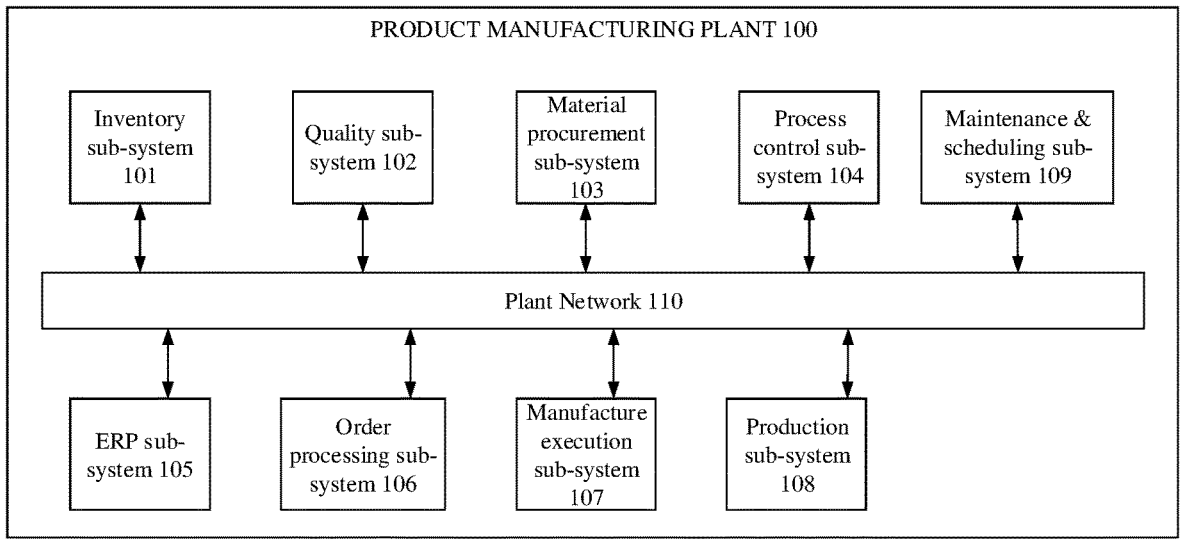
FIG. 1 shows a simplified block diagram of a product manufacturing plant, in accordance with an embodiment of the present disclosure.

FIG. 1 shows a simplified block diagram of a product manufacturing plant (100) (also referred as manufacturing plant). The manufacturing plant (100) generally comprises different subsystems. The subsystems can include, but are not limited to, an inventory sub-system (101), a quality sub-system (102), a material procurement sub-system (103), a process control sub-system (104), an Enterprise Resource Management (ERP) sub-system (105), an order processing sub-system (106), a manufacture execution sub-system (107), a production sub-system (108) and a maintenance and scheduling sub-system (109). A person of ordinary skill will appreciate that the manufacturing plant (100) can also comprise various other sub-systems.

In an embodiment, the product manufacture can commence from the material procurement sub-system (103). The material procurement sub-system (103) comprises information about the raw materials including but is not limited to specification of the raw materials, vendor details (international or local vendor), logistics, delivery time, amount of raw material, and the like.

In an embodiment, the inventory sub-system (101) focuses on maintaining records and movement and storage of raw materials. Particularly, the inventory sub-system (101) records the type of raw materials, date and time of request made for the raw materials, date and time of delivery of the raw materials, quantity of the delivered goods, etc.

In an embodiment, the production sub-system (108) tracks the flow of events throughout the production process. The production sub-system (108) also records change in the goods or transfer of goods from one place to another. For example, consider a manufacturing entity worked with three processing departments and one assembly department. As raw materials pass through the processes, the production sub-system (108) records the relevant information at specific time or locations until the manufactured product is transferred to stock room or warehouse (end of process).

In an embodiment, the maintaining and scheduling sub-system (109) equipment in the manufacturing plant (100) are generally required to be turned OFF, on periodic basis, for maintenance. Timely maintenance results in longer life span of an equipment. The maintenance activity has to be scheduled properly. Also, redundant equipment should be commissioned in place of the equipment under maintenance. Thus, the maintenance and scheduling sub-system (109) schedules maintenance activity for each equipment. Further, the maintenance and scheduling sub-system (109) can foresee any faults and can raise alerts to operators in the manufacturing plant (100). This sub-system (109) can also be used to record operating status of equipment. Performance of the manufacturing plant (100) increases by proper scheduling and maintaining jobs/events/activities.

In an embodiment, the quality sub-system (102) ensures the products manufactured are according to required specification. Various tests are performed to ensure the quality of the product meets the specification.

In an embodiment, the order processing sub-system (106) checks status of orders placed with suppliers, status of other sub-systems, quality of materials received, and other information related to suppliers.

In an embodiment, the ERP sub-system (105) helps track sales order, develop supply chain management, Key Progress Indicators (KPI) and production planning. The ERP sub-system (105) enables seamless integration of procurement modules, materials management, business modules, financial modules and manufacturing sub-systems.

In an embodiment, the process control sub-system (104) allows making decisions without manual interventions. In an embodiment, critical information is fed to the process control sub-system (104) and a decision (control strategy) is taken by the process control sub-system (104).

In an embodiment, the Manufacture Execution sub-System (MES) (107) tracks and gathers real-time data related to genealogy, performance, traceability, material management, work in progress, etc., to improve performance of the manufacturing plant (100). The MES (107) acts as a functional layer between the ERP sub-system (105) and the process control system (104).

In an embodiment, the manufacturing plant (100) comprises the plant network (110). The plant network (110) can be a Local Area Network (LAN) or can be connected to the Internet. In an embodiment, the sub-systems can be monitored remotely by an operator in the manufacturing plant (100).

Figure 2:
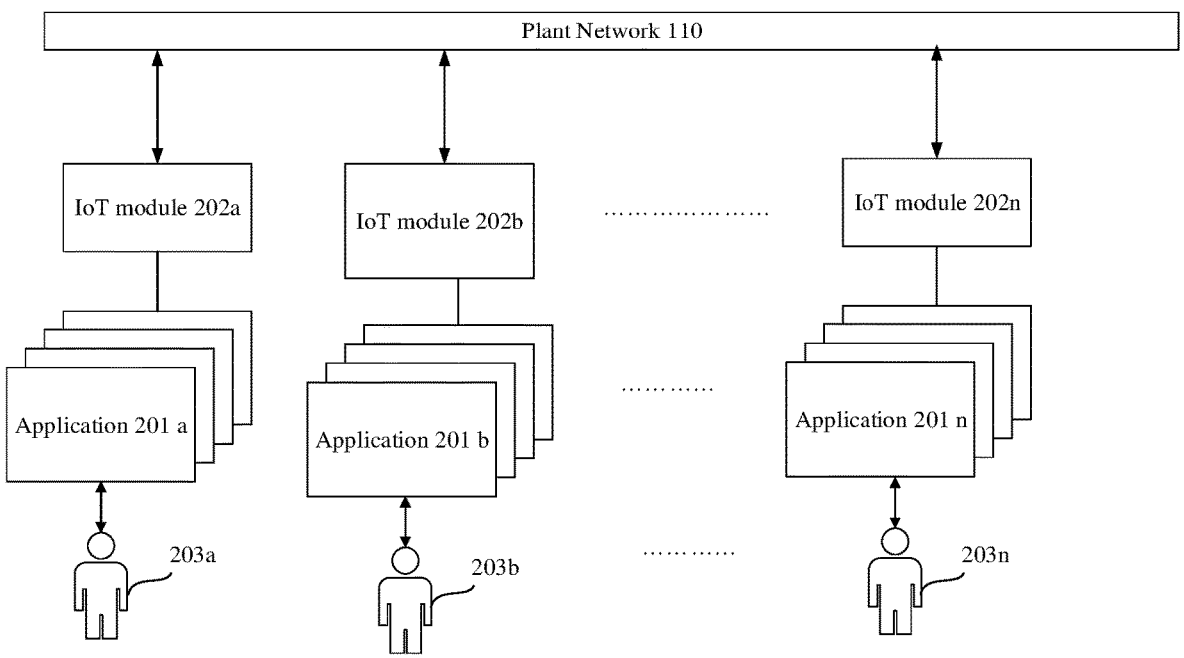
FIG. 2 shows a simplified block diagram of IoT module integration in the manufacturing plant, in accordance with an embodiment of the present disclosure.

Reference is now made to FIG. 2. As shown in FIG. 2, the one or more applications (201a, 201b, . . . 201n) (collectively represented as one or more applications (201) are connected to the plant network (110). In an embodiment, the one or more applications (201) are hosted in electronic devices (not shown) like servers, Personal Digital Assistants (PDA), mobile phones, laptops, etc. For example, the application (201a) can be installed/hosted in a first device configured to perform operations involved in inventory sub-system (101). The application (201b) can be installed in a second device configured to perform operations involved in production sub-system (108). Likewise, each sub-system can have respective one or more applications (201) for performing the operations in the respective sub-system.

In an embodiment, the IoT module (202a, 202b, . . . 202n—collectively represented as 202) is integrated with each application in each sub-system. In an embodiment, the IoT module (202) can be a plugin installed in the electronic device. The IoT module (202) is integrated with each application for providing connectivity between each other applications. For example, the IoT module (202a) is installed in the first device, is associated with the application (201a). Likewise, the IoT module (202b) installed in the second device is associated with the application (201b). Further, the IoT module (202) in each device is connected to the plant network (110). In an exemplary embodiment, the IoT module (202) in each device may form an ad-hoc network. In one embodiment, the IoT module (202) installed in each device acts as a communication interface between the one or more applications (201) installed in that device and the one or more applications (201) installed in other devices in the manufacturing plant (100). In an embodiment, the one or more applications (201) are comprises a plurality of operational parameters related to respective sub-systems. For example, an application in the inventory sub-system (101) can have operational parameters like quantity of materials, date and time of request made for the materials, date of dispatch of the material, date and time of delivery of the materials. etc. Likewise, each sub-system is associated with the plurality of operational parameters which are stored in respective one or more applications (201).

Figure 3:
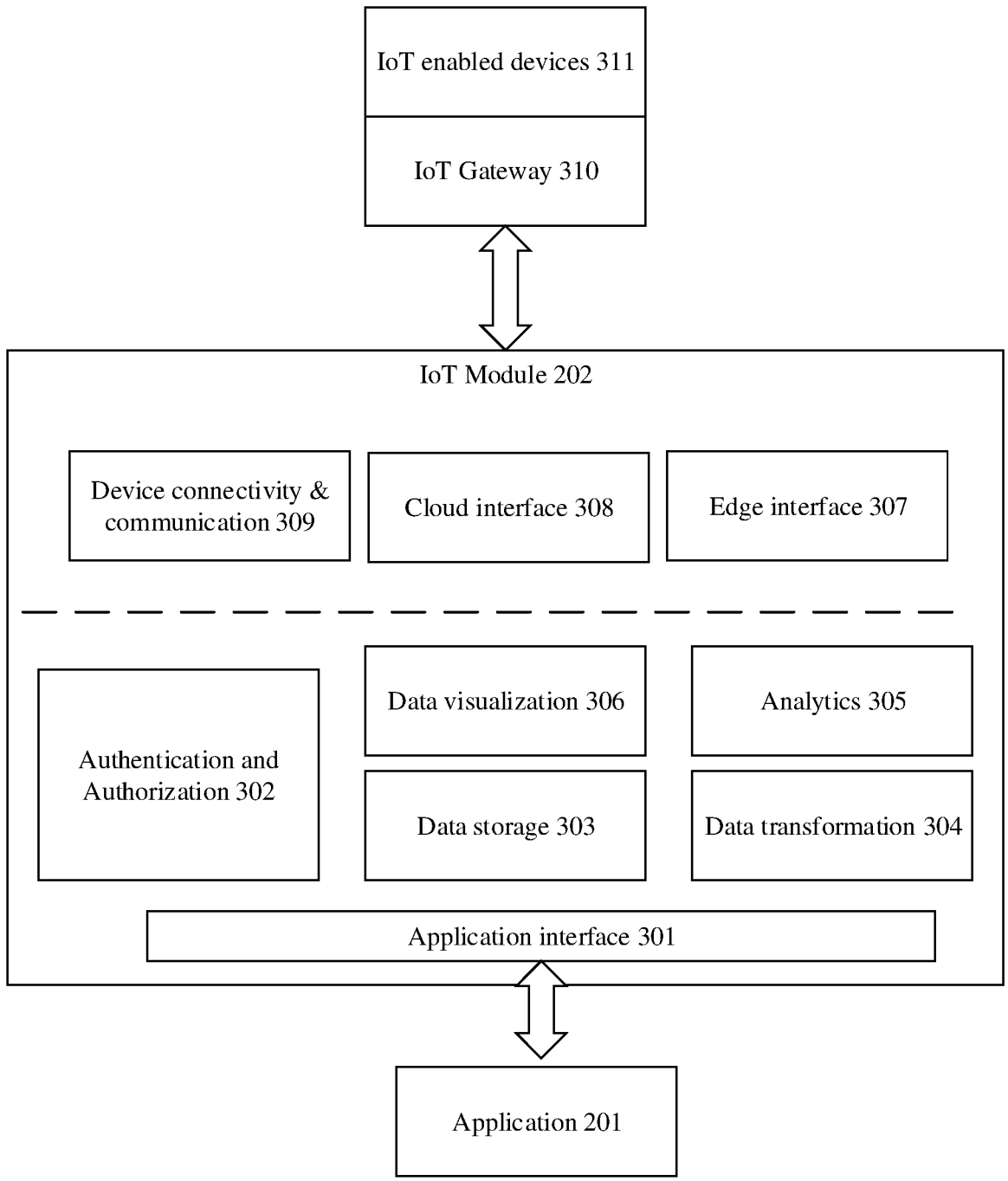
FIG. 3 shows a block diagram of an IoT module, in accordance with an embodiment of the present disclosure.

Reference is now made to FIG. 3. As shown, FIG. 3 shows a block diagram of an IoT module (202). The IoT module (202) comprises various sub-modules. The sub-modules can include but are not limited to an application interface module (301), an authentication and authorization module (302), a data storage module (303), a data transformation module (304). Analytics module 9305), a data visualization module (306), an edge interface (307), a cloud interface (308) and a device connectivity and communication module (309).

In an embodiment, the application interface (301) is configured to interface the IoT module (202) installed in a device, with the one or more applications (201) installed in the same device. The AI (301) provides communication between the IoT module (202) and the one or more applications (201). Thus, the IoT module (202) can receive data from the one or more application and send data to the one or more applications. In an embodiment, the AI (301) can be configured to regularly extract data from the one or more applications (201) at regular intervals.

In an embodiment, the authentication and authorization module (302) is configured to authenticate the operators to access the IoT module (202). For authentication, user ID and passwords, biometrics, or any other authentications methods can be used. In an embodiment, the authentication and authorization module (302) can implement encryption algorithms to protect the information/data received from the AI (301). In an embodiment, the authentication and authorization module (302) can authorize the authenticated operator to read/modify/delete selected data. In an embodiment, different levels of operators can be provided with different authority to handle data present in the IoT module (202). For example, a junior engineer working in production sub-system (108) can be given authority to upload parameters to the IoT module (202). However, the junior engineer can be restricted to delete already stored parameters or edit the already stored parameters. A senior engineer can be provided authority to delete/edit parameters stored in the IoT module (202). Thus, different levels of authorization provide security to the data stored in the IoT module (202).

In an embodiment, the data storage module (303) is configured to store the plurality of parameters associated with the respective sub-systems. The plurality of parameters is received from the one or more applications (201) via the AI (301). In an embodiment, the data storage module (303) use a memory segment of the device for storing the plurality of parameters.

In an embodiment, the data transformation module (304) transforms the parameters received from the AI (301) to a common format. The common format can be any existing format such as XML, TXT, etc. In an embodiment, if the parameters are stored in DOC format in the IoT module (202) and an excel requires the parameters stored in the IoT module (202), the data transformation module (204) is configured to transform the parameters to excel format and share the parameters. Thus, the data transformation module (304) present in the IoT module (202a) associated with the first application (201a) is configured to initially convert the data into the common format and store the data in the data storage module (303). Further, the data transformation module (304) present in the IoT module (202b) associated with the second application (201b), which required the data associated with the first application (201a), is configured to transform the data from the common format to the format used by the second application (201b).

In an embodiment, the analytics module (305) is configured to analyze the parameters. The analyzed parameters can be classified based on parameter type, authorization associated with the parameters, IoT sharing status, etc. The analytics module (305) helps in classification of the parameters and thus improves performance of the IoT module (202).

In an embodiment, the data visualization module (306) is configured to determine data patterns and make correlations. The patterns and correlations can also include quantity of parameters shared between any two applications, and frequency of data shared between any two applications. The data patterns can be used by operators for determining interoperability between sub-systems of the manufacturing plant (100).

In an embodiment, the cloud interface (308) is configured to be integrated with a cloud platform. The plurality of parameters can be stored in the cloud platform and can be accessed remotely via internet.

In an embodiment, the device connectivity and communication module (309) is configured to connect to the plant network (110). This module establishes connectivity between different IoT modules (202) within the manufacturing plant (100).

Figure 4:
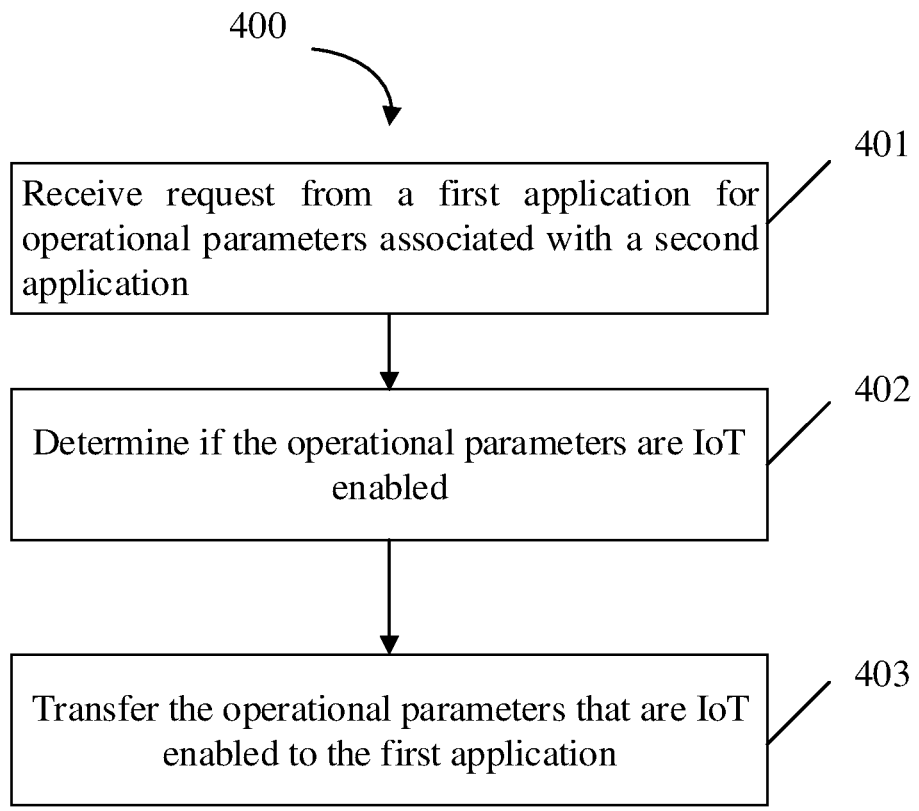
FIG. 4 shows an exemplary flowchart for controlling data transfer in a manufacturing plant, in accordance with an embodiment of the present disclosure.

Reference is now made to FIG. 4. FIG. 4 shows a flowchart illustrating method steps for controlling transfer of data in the manufacturing plant (100).

Figure 6:
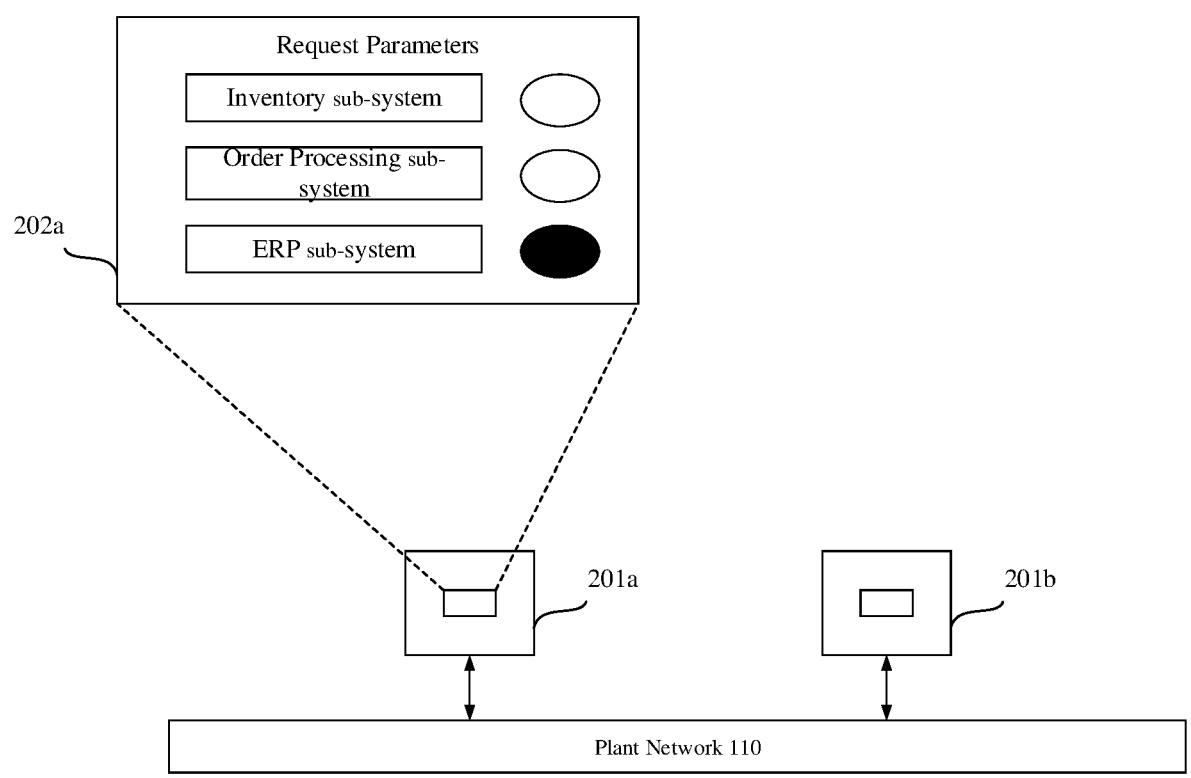

At step 401, the second IoT module (202b) receives a request from the first IoT module (202a), for plurality of parameters associated with the second application (201b) (or one or more applications). In an embodiment, an operator operating the first application (201a) uses the user interface (UI) (not shown) of the IoT module (202a) to request parameters that are required from the first application (201a)/from a particular sub-system. For example, let us consider that the first application (201a) is used to operate the ERP sub-system (105). Also let us consider that the first application (201a) is used to operate the inventory sub-system (101). Referring to FIG. 6, a UI is shown for requesting parameters using the IoT module (202a). As shown, the UI can display all the sub-systems available in the manufacturing plant (100). The operator can select the sub-system from which the parameters are required. As shown in FIG. 6, the ERP sub-system (105) is selected.

Figure 7:
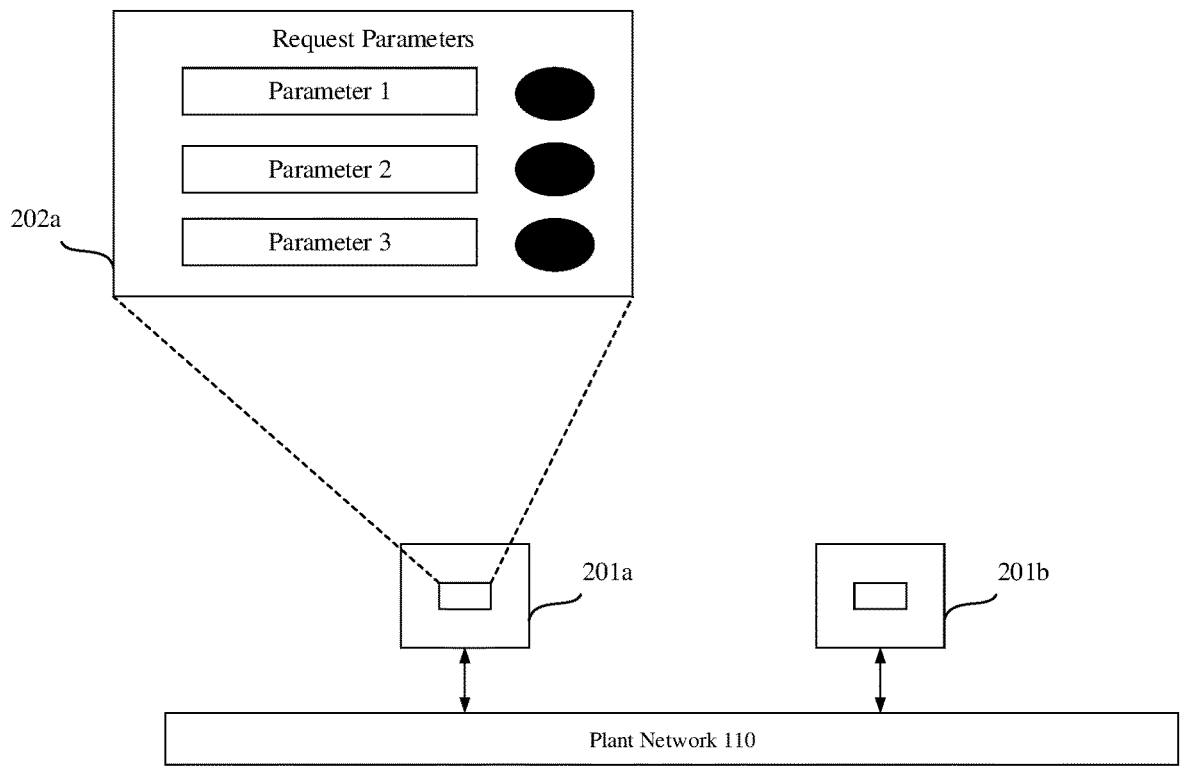

FIG. 7 shows a UI for selecting parameters required from a selected sub-system. The UI as shown in FIG. 7 is a subsequent page after selecting the sub-system. The operator can select the parameters required for the working of the inventory sub-system (101). As shown in FIG. 7, the operator has requested parameter 1, parameter 2 and parameter 3 from the application (201a) in the ERP sub-system (105).

Figure 5:
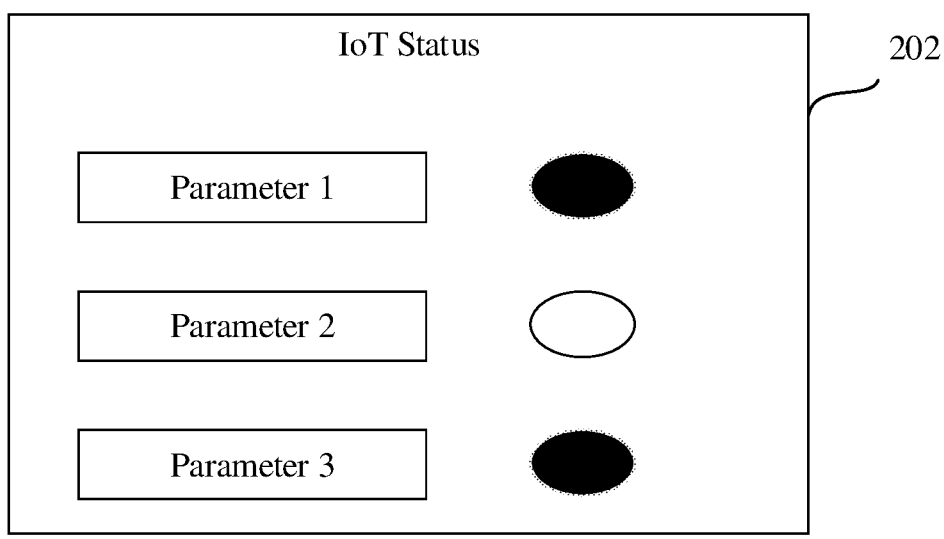
FIG. 5 shows a user interface of IoT module associated with an application, in accordance with an embodiment of the present disclosure; and FIG. 6, FIG. 7

FIG. 5 shows a UI for enabling parameters for sharing over the plant network (110). An operator can select the parameters which has to be shared over the plant network (110). In an embodiment, the selected parameters have a status "IoT enabled". Considering the above example, let FIG. 5 resemble the UI of the first application (201a) configured to operate the ERP sub-system (105). Here, the operator has selected parameter 1 and parameter 3 as "IoT enabled" and parameter 2 is "IoT disabled". Thus, only parameter 1 and parameter 2 can be shared over the plant network (110).

Referring back to FIG. 4, at step 402, the IoT module (202b) determines if the requested parameters are IoT enabled. Considering the above example, the requested parameters are parameter 1, parameter 2 and parameter 3. However, the IoT enabled parameter 1 and parameter 3.

At step 403, the IoT module (202b) transfers the parameters that are IoT enabled (parameter 1 and parameter 3) to the IoT module (202a) over the plant network (110).

Figure 8:
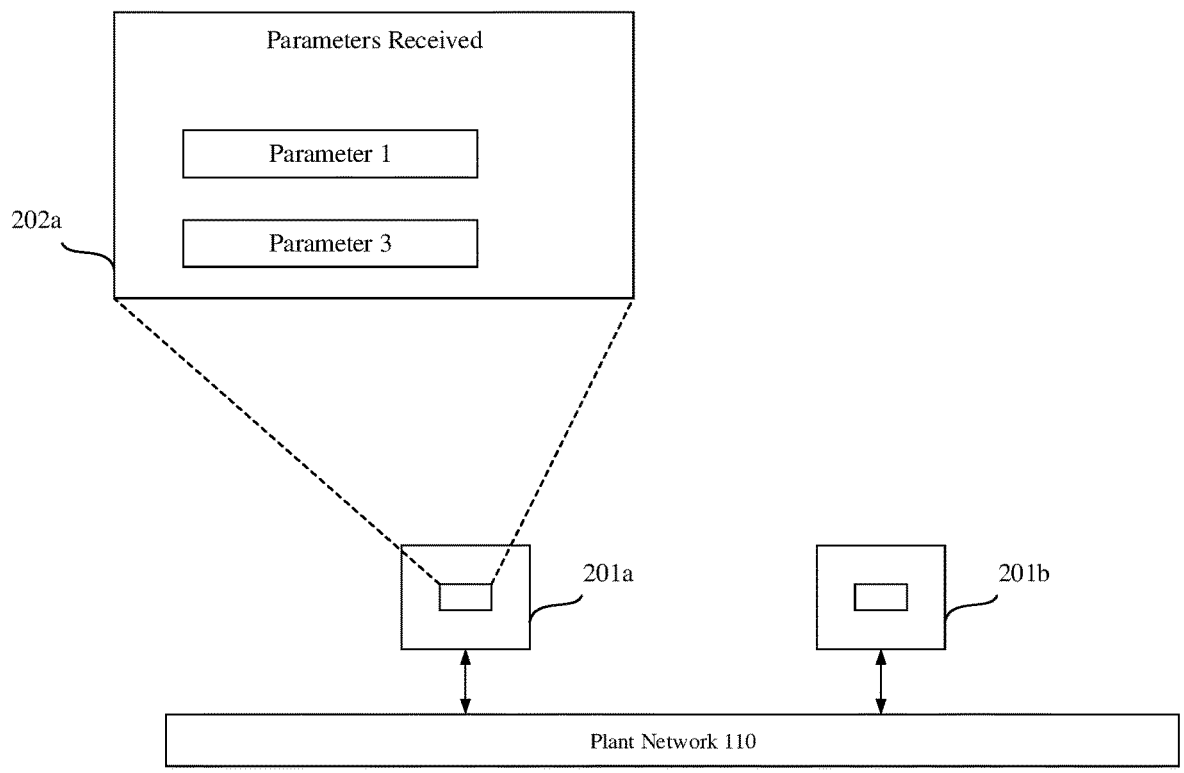
FIG. 8 shows an illustration of data transfer from one application to another application via IoT module, in accordance with an embodiment of the present disclosure.

FIG. 8 shows UI of the IoT module (202a) after receiving the requested parameters. As shown, the IoT module (202a) receives only two from the three requested parameters. As parameter 2 is not IoT enabled, this parameter is not shared. Thus, the IoT module (202a) receives only the parameter 1 and the parameter 2.

As seen from the above example, it is evident that the present invention provides security to the data shared in the manufacturing plant (100). In an embodiment, the present invention provides a user friendly, modular and flexible solution for transferring data in the manufacturing plant (100).

In an embodiment, the present invention can be implemented with ease in the manufacturing plant (100) and can be scaled to any number of sub-systems.

In an embodiment, the present invention reduces load of cloud and plant network as the data is shared in a regulated and controlled manner.

This written description uses examples to describe the subject matter herein, including the best mode, and also to enable any person skilled in the art to make and use the subject matter. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

REFERRAL NUMERALS

Inventory sub-system—101
Quality sub-system—102
Material procurement sub-system—103
Process control sub-system—104
ERP sub-system—105
Order processing sub-system—106
MES sub-system—107
Production sub-system—108
Maintenance and scheduling sub-system—109
Plant network—110
Applications—201
IoT module—202
Operator—203
AI—301
Authentication and authorization module—302
Data storage module—303
Data transformation module—304
Data analytics module—305
Data visualization module—306
Edge interface—307
Cloud interface—308
Device connectivity and communication module—309
IoT gateway—310
IoT enabled devices—311

The invention claimed is:

1. A method of controlling data transfer in a manufacturing plant, wherein the manufacturing plant comprises a plurality of subsystems comprising at least one of an inventory system, a quality system, a material procurement system, a process control system, an Enterprise Management Platform (ERP) system, an order processing system, a manufacture execution system, a production system, a maintenance and a scheduling system, wherein each subsystem is associated with a plurality of operational parameters, wherein each subsystem includes one or more applications using corresponding plurality of operational parameters, wherein each application is configured to transfer at least one operational parameter from the plurality of operational parameters to at least one of remaining applications over a manufacturing plant network, the method comprising:
   receiving a request from a first IoT module installed on a first device for a plurality of operational parameters associated with at least a second IoT module installed on a second device;
   determining a status assigned to each of the plurality of operational parameters, wherein the status is one of IoT enabled or IoT disabled, wherein the status is indicative of an authorization for transferring the respective plurality of operational parameters over the manufacturing plant network;
   generating a first subset of the plurality of operational parameters, wherein the respective status of each operational parameter of the first subset of the plurality of operational parameters is set to IoT enabled;
   generating a second subset of the plurality of operational parameters, wherein the respective status of each operational parameter of the second subset of the plurality of operational parameters is set to IoT disabled; and
   transferring the first subset of the plurality of operational parameters to the first IoT module installed on the first device based on the determined status, for controlling data transfer in the manufacturing plant, wherein transferring the first subset of the plurality of operational parameters comprises establishing an ad-hoc network between the first IoT module and the second IoT module.

2. The method as claimed in claim 1, wherein the first IoT module is integrated with each of the one or more applications via an application interface, wherein the application interface enables data extraction from the one or more applications.

3. The method as claimed in claim 1, wherein the plurality of operational parameters are stored in the first IoT module for transferring over the manufacturing plant network, upon the status of the plurality of operational parameters is set to IoT enabled.

4. The method as claimed in claim 1, wherein the status of the plurality of operational parameters is set to one of IoT enabled or IoT disabled by an operator.

5. The method as claimed in claim 1, wherein the plurality of operational parameters is transferred to at least one application from the one or more applications selected by an operator.

6. The method as claimed in claim 1, wherein the status of the plurality of operational parameters is set before the request for the plurality of operational parameters is received.

7. A plurality of Internet of Things (IoT) modules for controlling data transfer in a manufacturing plant, wherein the manufacturing plant comprises a plurality of subsystems comprising at least one of an inventory system, a quality system, a material procurement system, a process control system, an Enterprise Management Platform (ERP) system, an order processing system, a manufacture execution system, a production system, a maintenance and a scheduling system, wherein each subsystem is associated with a plurality of operational parameters, wherein each subsystem is operated by one or more applications using corresponding plurality of operational parameters, wherein each application is configured to transfer at least one operational parameter from the plurality of operational parameters to at least one of remaining applications over a manufacturing plant network, wherein the plurality of IoT modules are module is associated with the manufacturing plant network, wherein each IoT module of the plurality of IoT modules comprises:
 an application interface;
 a memory; and
 a processor configured to:
  receive a request from a first IoT module of the plurality of IoT modules installed on a first device for a plurality of operational parameters associated with at least a second IoT module of the plurality of IoT modules installed on a second device;
  determine a status assigned to each one of the plurality of operational parameters, wherein the status is one of IoT enabled or IoT disabled, wherein the status is indicative of an authorization for transferring the respective plurality of operational parameters over the manufacturing plant network;
  generate a first subset of the plurality of operational parameters, wherein the respective status of each operational parameter of the first subset of the plurality of operational parameters is set to IoT enabled;
  generate a second subset of the plurality of operational parameters, wherein the respective status of each operational parameter of the second subset of the plurality of operational parameters is set to IoT disabled; and
  transfer the first subset of the plurality of operational parameters to the first IoT module installed on the first device based on the determined status, for controlling data transfer in the manufacturing plant, wherein transferring the first subset of the plurality of operational parameters comprises establishing an ad-hoc network between the first IoT module and the second IoT module.

8. The IoT module as claimed in claim 7, wherein the application interface is used for integrating with each of the one or more applications, wherein the application interface enables data extraction from the one or more applications.

9. The IoT module as claimed in claim 7, wherein the memory is configured to store the plurality of operational parameters associated with the IoT enabled status for transferring over the manufacturing plant network.

10. The IoT module as claimed in claim 7, wherein the processor is configured to set the status of the plurality of operational parameters to one of IoT enabled or IoT disabled upon receiving input by an operator.

11. The IoT module as claimed in claim 7, wherein the processor is configured to transfer the plurality of operational parameters to at least one application from the one or more applications selected by an operator.

* * * * *